United States Patent [19]

White et al.

[11] 3,782,300
[45] Jan. 1, 1974

[54] HUMAN WASTE INCINERATOR

[75] Inventors: David J. White, Torrance; Donald J. Dion, Lakeside, both of Calif.

[73] Assignee: Mobile Systems International, Inc., El Cajon, Calif.

[22] Filed: Sept. 30, 1971

[21] Appl. No.: 185,213

[52] U.S. Cl. .................................. 110/8 R, 110/10
[51] Int. Cl. ............................................. F23g 7/00
[58] Field of Search ...................... 110/7 R, 8 R, 10; 159/16 A; 210/62

[56] References Cited
UNITED STATES PATENTS

| | | | |
|---|---|---|---|
| 3,622,511 | 11/1971 | Pizzo et al. | 210/62 |
| 2,638,444 | 5/1953 | Kappe | 159/16 A |
| 2,538,412 | 1/1951 | Cecil et al. | 159/16 A |
| 3,642,583 | 2/1972 | Greenberg | 159/16 A |

*Primary Examiner*—Kenneth W. Sprague
*Attorney*—Brown et al.

[57] ABSTRACT

An incinerator for disposing of sewage that incorporates a combustor to develop high temperatures and an injection tube to deliver heat directly to the sewage. The sewage is vaporized and passes through a residence chamber. The residence chamber is raised to an elevated temperature of approximately 1600 degrees F. by gas from the combustor. This high temperature oxidizes any organic contaminates. The exterior surfaces of the device are maintained at close to ambient temperatures through the use of an induction system that brings the combustor air through a passage between the inner and outer tanks.

8 Claims, 5 Drawing Figures

INVENTORS
DAVID J. WHITE
DONALD J. DION

BY Brown & Martin

ATTORNEYS

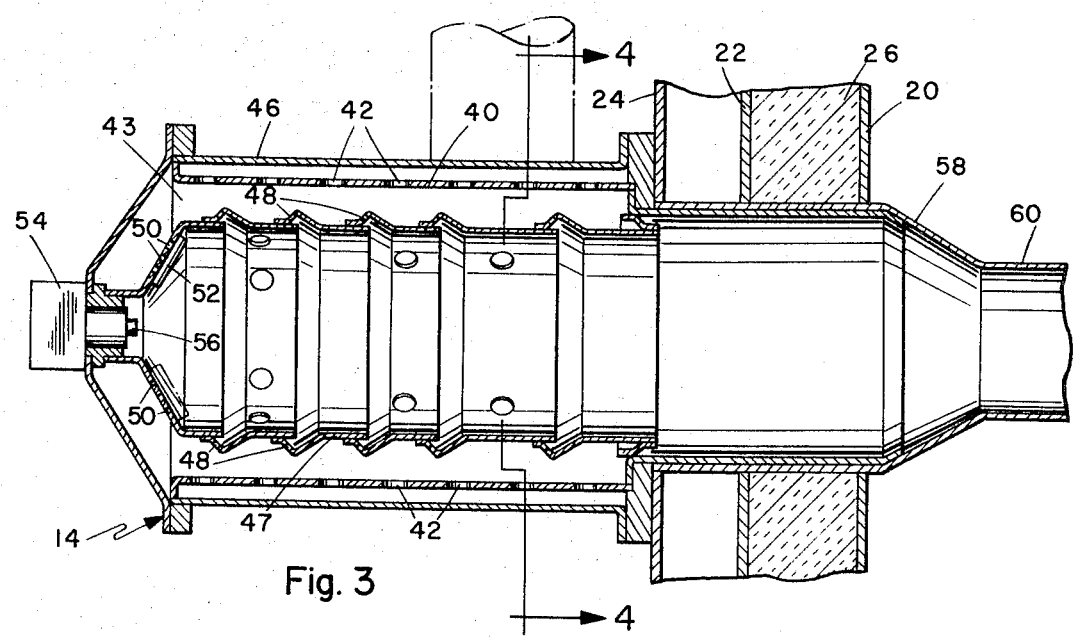
Fig. 3
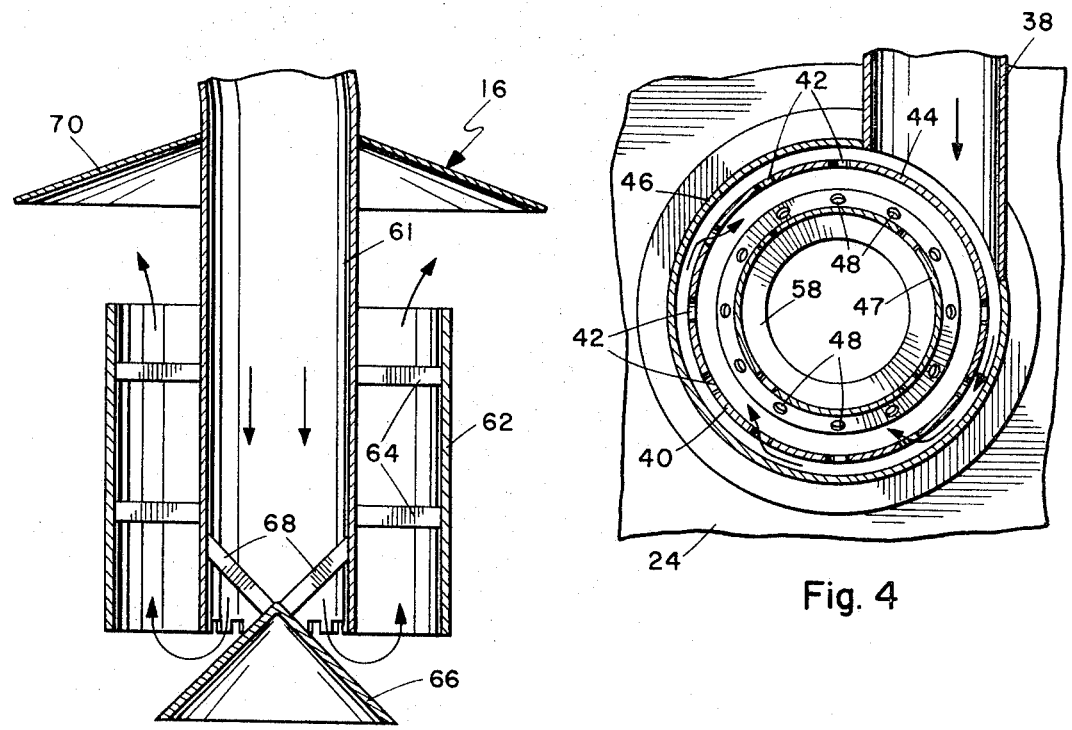
Fig. 5
Fig. 4

3,782,300

HUMAN WASTE INCINERATOR

BACKGROUND OF THE INVENTION

High population densities and the demand for better environmental design has given rise in recent years, to the need for improved sanitation facilities. This demand now exists at remote locations and those locations that, of necessity, must be moved from time to time or are otherwise temporary in nature. Examples of those facilities that may require such sanitation facilities include mobile home or trailer parks, military missions, and campgrounds. It has previously been the practice in these operations to either provide the minimal outhouse type facilities with no provision for disposing of the sewage material, or to utilize one of many variations of cesspools and sceptic tank types of installation. More recently, chemical toilets of one kind or another have been employed, however these toilets produce a liquid discharge that, either must be stored for trucking to a sewage treatment plant, or otherwise disposed of.

Prior art systems therefore were deficient in that, they were either detrimental to the ecology, since they dumped raw sewage in or on the near surface of the ground, or because they required elaborate sceptic facilities that are expensive to install and require maintenance.

Therefore it would be desirable if an improved method of disposing of sewage waste could be devised that would be applicable to use at temporary sites and remote facilities where standard sewage treatment facilities are not available.

SUMMARY OF THE INVENTION

The exemplary embodiment of the invention employs a unique system for disposing of human waste and other sewage by incineration. The process of incineration is accomplished in a manner that breaks down the organic contaminates into unobjectionable and oxidized gaseous exhaust and does so in an efficient manner, that does not add significant quantities of other contaiminates to the atmosphere.

The invention utilizes an insulated tank that is capable of storing sufficient quantities of sewage to handle the particular installation. The sewage comprises waste matter suspended in an aqueous solution, thus, before any incineration can begin, the water must be driven off, and large quantities of heat must be transferred to the water for this purpose. After the water is driven off, the heat must be effectively transferred to the sludge that remains until the sludge is completely incinerated and only a light ash remains. The ash is of such a small quantity that it need be removed, only after long periods of use. To accomplish the effective transfer of heat to the sewage during both phases of operation, the invention employs a combustor. Air is supplied to the combustor by a blower that is capable of supplying air of a sufficient pressure to overcome the pressure head produced by the fluid in the tank and pressure drop through the piping to the tank. A unique colander design distributes the air from the blower, evenly around an inner-core heat-chamber member by providing a solid area in the colander member immediately adjacent the input of blower air. This area deflects the air around the dylindrical colander member to provide substantially equal pressure at all points around an inner core cylindrical member that has a plurality of openings at one end to inject the combustion air immediately adjacent the fuel injection point and thereby provide for ignition of the fuel at one end of the chamber. Additional injector openings are spaced along the inner core cylindrical member, and the blower air is directed in such a manner that it tends to flow along the walls of the inner core member, to cool the walls and keep the extremely high temperature flame from contacting the walls directly. This design enables the combustor to be made of relatively unsophisticated and low cost materials, while efficiently generating extremely high temperatures.

The high temperature gas generated in the combustor is carried by the injector means into the tank and injected into the sewage below the initial water level thereof. The gas bubbling from the end of the injector tube rises, by virtue of its low density, and is constrained to the vicinity immediately adjacent the injector tube by a collar surrounding the tube. This combination of a downwardly flowing gas which is constrained to upward movement in the immediate vicinity of the injector tube comprises a gas-lift device. The gas-lift device is effective both to provide a pumping action to circulate the sewage in a high agitated manner, while it remains in suspension during the vaporizing process, and also serves the function of providing a long path of contact between the hot gases and the sewage, to transfer to the sewage substantially all of the heat contained in the high temperature gas.

After substantially all of the fluid has been boiled off, the invention provides for the heating of the relatively dry material remaining, by direct contact with the gaseous stream. This stream is defected from its downward path by a coaxial deflector. The effect of this deflector is to maintain scouring flow of gas across the bottom of the tank and up its walls in a swirling manner to continue to agitate the solid material until it is completely oxidized and burned.

The vapor and other exhaust gas exits the tank at the upper portion thereof and enters a residence chamber. This chamber comprises a plenum chamber, wherein the air first flows upward and then downwardly to increase the residence time of the gases in the chamber. The chamber is maintained at an elevated temperature by direct injection of gas tapped from the gas delivered to the injector tube. The gas quantity is regulated to maintain the residence chamber at approximately 1600° F. This temperature is sufficiently elevated to oxidize any remaining contaminates, comprising organic material that has been carried with the vapor and other discharges from the tank. Additional features of the invention are incorporated to provide a system that is safe to use in proximity to people, without elaborate safety precautions. In particular, the temperature of the exterior of the device is maintained at a safe level through the use of an annulus surrounding an inner tank member to prevent the heat from raising the exterior temperature to an unacceptable degree and has the additional effect of acting as a preheater for the combustor. The air for the combustor is drawn, by the blower, through the annulus surrounding the tank and the air is heated by the high tank temperatures. Similarly, the residence chamber is insulated by a dead air space between the interior residence chamber and the exterior of the exhaust system to provide insulation and finally, an exhaust pipe extends, vertically from the residence chamber, a sufficient distance so that the hot gases discharged cannot contact or cause damage to persons or property in the vicinity.

It is therefore an object of this invention to provide a new and improved human waste incinerator.

It is another object of the invention to provide a new and improved incinerator utilizing a high efficiency combustor design.

It is another object of the invention to provide a new and improved incinerator with means for providing a high heat transfer efficiency between heated gases and waste material.

It is another object of the invention to provide a new and improved incinerator that incorporates means for maintaining high heat transfer efficiency after the liquid fraction of the waste material has been vaporized.

It is another object of the invention to provide a new and improved incinerator that incorporates means to fully oxidize any organic contaminated that would otherwise be exhausted.

It is another object of the invention to provide a new and improved incinerator with means to maintain the exterior temperatures of the apparatus at a safe level.

Other objects and many attendant advantages of the invention will become more apparent from the reading of the following detailed description and an examination of the drawings wherein like reference numerals refer to like parts throughout and in which:

FIG. 3 is an enlarged sectional view taken on line 3—3 of FIG. 1.

FIG. 4 is a sectional view taken on line 4—4 of FIG. 3.

FIG. 5 is an enlarged view of the hot gas distributing structure as shown in FIG. 1.

Figure 1:
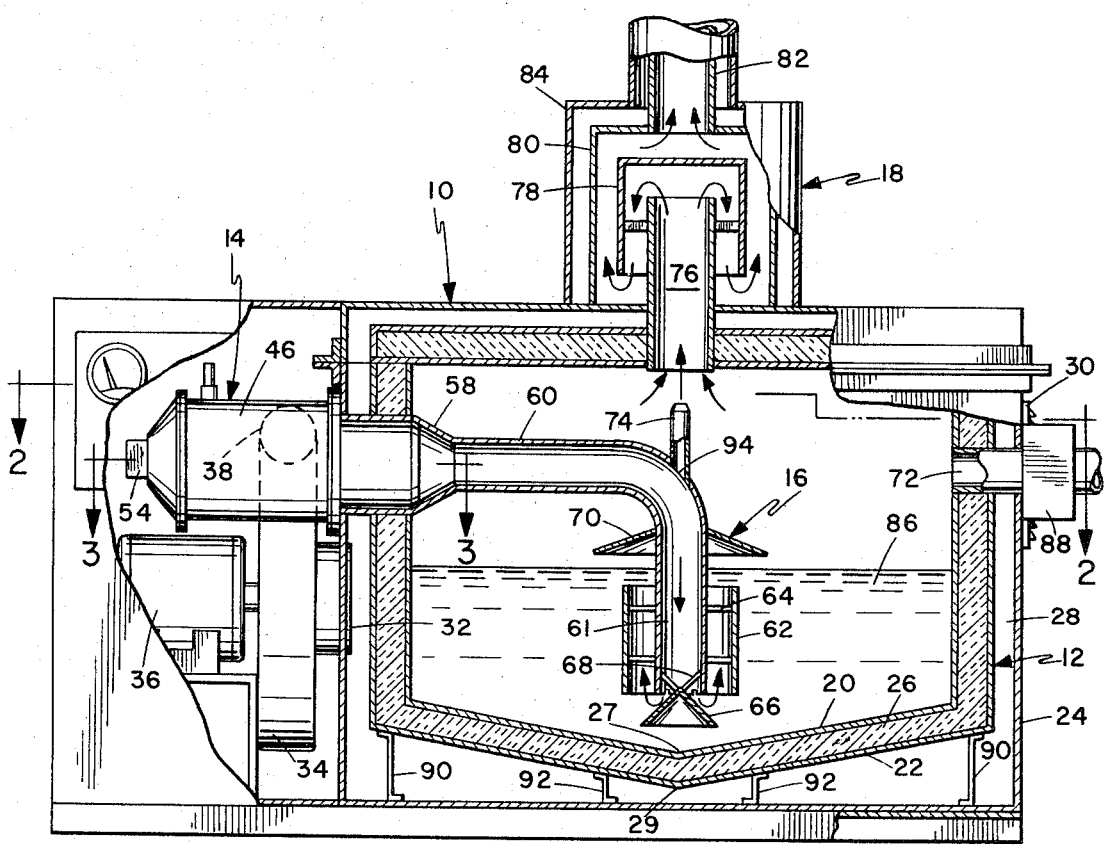
FIG. 1 is a side elevation view of the complete unit with portions cut away.
Figure 2:
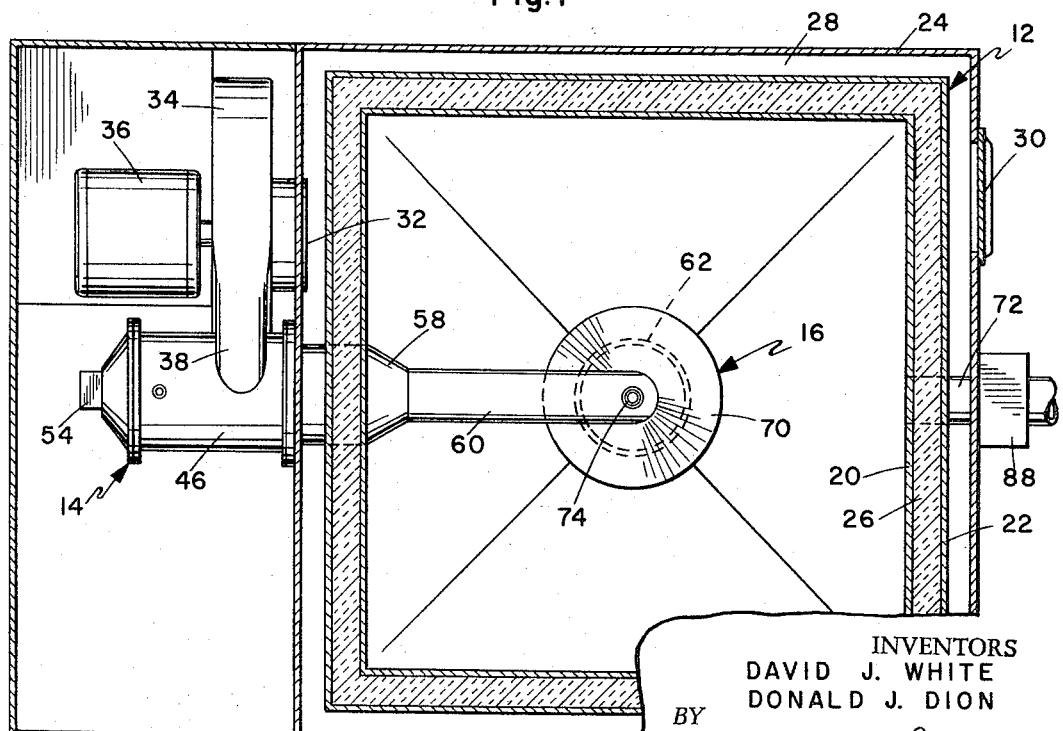
FIG. 2 is a sectional view taken on line 2—2 of FIG. 1.

Referring now to the drawings, there is illustrated an incinerator unit 10 generally comprising a tank member 12, a combustor 14, an injector means 16, and a residence means 18. The tank construction includes an inner member 20. This inner tank member is made of corrosion resistance material, capable of withstanding exposure to high temperatures and the corrosive liquid effluent. The inner tank 20 is spaced from an intermediate tank 22 by a layer of insulation 26. The insulation is capable of withstanding exposure to high temperatures and provides a high temperature drop and low heat transfer to the exterior of the apparatus. The intermediate tank 22 is spaced from the exterior structure 24 and is supported on a plurality of brackets 90 near its outer edges and a plurality of brackets 92 toward the interior. The intermediate tank therefore is supported on the outer tank or exterior structure 24, and is spaced therefrom, by an air gap 28. The inner tank has a low point 27 that is located immediately under the air injector to be described more fully hereinafter. The intermediate tank member has corresponding low point 29, whereas the exterior tank 24 has a rectangular configuration and includes an extension for housing the blower, combustor, and other apparatus of the invention.

A blower 34 draws intake air through an inlet 32, which is in pneumatic communication with the annulus or air gap 28 surrounding the intermediate tank member 22. The outside air enters the tank annulus through a vent means 30 adjacent the waste inlet 72. The location of the air inlet 30 ensures that the air will flow across the surface of the intermediate tank member, withdrawing heat from that member, and increasing in temperature as it passes into the blower 34 through the inlet portion 32. An electric motor or other power source 36 rotates the centrifugal blower and produces an axial flow from the blower of sufficient volume and pressure, to overcome the pressure head in the system, and supply an adequate flow of air through the combustor 14. A duct 38 delivers the pressurized air from the blower 34, to a colander member 40, that is surrounded by an exterior shell 46. The spacing between the colander and the exterior shell creates an annular chamber surrounding an inner core member for combustor chamber 47. The colander has a plurality of holes 42 surrounding its entire length and circumference, with the exception of the area 44, immediately adjacent the intake duct 38. The area 44 has been left void of holes to avoid excessive flow through that area. Thus, air from the blower is forced to flow around the periphery of the colander 40 and is relatively evenly distributed to the plurality of holes 42. After passing through the holes 42, the air enters a plenum chamber 43, surrounding the inner core member of the combustor. The chamber 43 is generally cylindrical in configuration and surrounds the complete inner core member along its entire length. The injector end of the inner core member is provided with a fuel injection system 54, terminating in a fuel injecting nozzle 56, for atomizing fuel into the inner core combustion chamber. The primary combustion air enters the chamber through a plurality of holes 50 in the end of the combustor and is deflected by swirl plates 52 to create a turbulence that ensures maximum burning efficiency. The air flow ensures that as the flame front progresses down the combustion chamber, further combustion is facilitated, as well as the wall surfaces being protected. The flow is provided through a plurality of angular inlets 48, spaced along the length of the combustion chamber. These inlets receive air from the plenum chamber 43 supplied by the colander. Because the inlets are at an angle to the sides of the chamber the air flowing through them tends to cling to the walls of the chamber, and this air shields the walls of the chamber from the extremely high temperatures in the burning zone.

The high temperature gases, produced in the combustor, pass through a converging transfer section 58 and through the walls of the tank members, into the inner tank. The gases are conveyed to the injector means 16 by a pipe 60, from a generally horizontal flow to a downward vertical flow, until they exit the injector tube 61. Since the tank when it is full of liquid presents a substantially high density medium to the gases, and because the gases are at an elevated temperature, they immediately reverse their flow from vertically down to vertically up, creating an extremely powerful flow of bubbles toward the surface of the effluent. These bubbles have a pumping effect on the water they carry along with them, raising that water in a column up to the deflector plate 70, surrounding the injector tube. During the period that the bubbles travel in intimate contact with the effluent, they transfer most of their heat to the effluent and rapidly boil off the water in the tank. The gas lift effect is enhanced by the provision of a concentric tube 62 supported on the injection tube by a plurality of supports 64. The concentric tube constrains the gas flow to the intermediate proximity of the injector.

After substantially all of the liquid is boiled off from the effluent, there remains a heavy sludge-like material, in the bottom portion of the tank. The hot gases exiting the injector tube, at this stage of operation, are diverted by a coaxially mounted core diverter 66, supported on a plurality of supports 68 within the injector tube 61. The gases deflected by the deflector 66 create a swirling effect within the tank, passing along the bottom portion of the tank, and up its sides creating vortexes and eddys to ensure that all of the material within the tank is constantly being heated and agitated. By this process, substantially all of the oxidizable material is rapidly burned off and there remains only a small amount of ash. The ash settles to the lowest portion 27 of the tank and may be removed periodically.

All of the vapor and other gases produced in the operation of the system exit the tank through an exhaust system, located in the upper portion of the tank. The exhaust system includes a first stage exhaust 76, leading into a residence chamber formed by baffle section 78 and plenum chamber 80, so that the exhaust gases must follow a labyrinth type path before exiting the system, and therefore have a higher time duration within the residence chamber. The residence chamber's temperature is maintained at a high level by a tap 74 located on the injector tube 61. The tap has access to the interior of the injector tube through a hole 94. Hot gas flows from the tap into the residence chamber to raise the residence chamber to approximately 1600 degrees F. The flow rate necessary to maintain the temperature is regulated by conventional flow regulating means (not shown). This temperature is sufficiently elevated, and the time that the gases are in the residence chamber is of sufficient duration, to oxidize all of the organic components being driven off by the incineration process, and the gases enter the exhaust duct 82 substantially free of any polutants. The exterior of the residence chamber and exhaust system is protected by an exterior covering 84, that is spaced by an air gap from the residence chamber itself.

In operation, the incinerator of the invention is located in the field near the site of the sewage to be disposed. Because the incinerator is a self-contained package it is possible to truck transport it or otherwise transport it fully assembled to the site of operations. The unit is self-contained, requiring only electrical connections for operation. Any type of sewage may be disposed of but the unit is particularly adapted for use in connection with chemical toilets. The toilet facility should be provided with a holding capacity sufficient to allow a charge of sewage to be incinerated prior to the unit accepting additional sewage. In a typical installation the tank 20 will have a capacity of approximately 72 gallons and the unit is capable of completely disposing of this volume in one hour. When the 72 gallon capacity is reached, the valve 88 is closed and the combustor ignited by initiating the operation of the blower and fuel injector pump together with the operation of an ignition system (not shown). The blower draws its air from the annulus between the intermediate tank 22 and the outer tank 24 across substantially the entire length of the tank, so that the outer surface of the intermediate tank is maintained at a relatively low temperature. This cooling effect together with the air gap between the intermediate tank member and the external member maintains the external skin at near ambient conditions, with five degrees above the ambient condition being a typical figure.

The combustor design is such that the fuel is burned with an extremely high efficiency producing savings on fuel costs and also reducing objectionable pollutant emissions due to the combustion process, to a minimal level. The efficiency of the combustor is due in part to the manner in which the initial combustion air is injected from the end of the combustor core. The injection method introduces a swirl to the combustion air and produces a flame front that is continually exposed to additional oxygen, thereby ensuring that all fuel is thoroughly burned. Additional combustion and cooling air is introduced into the combustor core at stages along its length, by a plurality of openings. Air is introduced through the openings at an angle to the axis of the combustor core to cause the air to follow the surface contours of the walls. This cooling air therefore insulates the walls from the extremely high temperatures present toward the center of the combustor core, by continuously replacing a cool layer of air. The additional air is also effective to ensure more complete combustion.

After passing through a converging section, the hot combustion gases enter the injection tube and are forced by the pressure of the blower and the heat of combustion to enter the liquid effluent below the upper surface thereof, and the gases therefore bubble to the surface in a vigorous manner. The gas is confined between the outer diameter of the injector tube and the inner diameter of the concentric pipe mounted on the injector tube. This effect, known as a gas lift effect, creates a pumping action that maintains the liquid 86 in the system in constant circulation, maintaining all of the solids in suspension and ensuring an extremely high rate of heat transfer, whereby an efficient quantity of heat is removed from the combustion gases prior to their exit from the system to the stack. The heat transfer is so great that approximately 72 gallons may be vaporized in the first six minutes of operation, and the remainder of the cycle is for the purpose of full incineration of the solid contents. During the solid content incineration phase, an additional feature of the injector tube, comprising the axially mounted diverter cone 66, creates a swirling action within the tank, scrubbing the bottom and side walls, and maintaining the increasingly dryer matter in an agitated condition, so heat is transferred to all of the solid matter.

During the final phase of operation the particular matter has been reduced to that very small fraction of its original volume, that is wholly uncombustible, and this ash settles to the very bottom of the system at its low point 27. Therefore, substantially all of the sewage has been converted to a vapor or gaseous form and has passed out of the system through the exhaust and residence chamber. The residence chamber ensures that the gases will remain within the system for a sufficient time for the high temperatures therein to induce final oxidation of organic components that may be forced off with the vapors from the system. The residence chamber accomplishes the final conversion of organic components by making the exhaust gases follow a labyrinth-like path, producing the time delay necessary for the high temperature to oxidize these components. The temperature in the exhaust stack-residence chamber is maintained by direct injection of combustion gases through the tap 74 on the injection tube. The quantity of these hot gases reaching the residence chamber is regulated to maintain the residence chamber at approximately 1600° F. so that the gases leaving the system are all substantially non-polluting, non-contaminating, non-toxic, and non-odorous.

Having described our invention, we now claim.

1. A waste incinerator for converting sewage or other wastes into a non-toxic gaseous form comprising:
   combustion means for producing pressurized high temperature gas;
   tank means for containing the sewage to be treated;
   injector means for introducing said gas into said sewage below the initial level thereof;
   exhaust means for conveying said gas and vaporized sewage to the exterior of said tank means;
   said combustion means comprising a generally cylindrical inner core member having a plurality of air injection openings along its length;
   a generally cylindrical colander element surrounding said core member and having a plurality of openings distributed over substantially all of its surface excepting that portion of its surface adjacent the air inlet from a blower,
   and whereby combustion and cooling air is distributed substantially equally to all of said injection openings in said core.

2. The incinerator of claim 1 wherein:
   said injector means comprising:
   a generally vertical pipe member having a discharge end spaced from the bottom of said tank means;
   and a concentric tube member surrounding said vertical pipe member at the lower portion thereof.

3. The incinerator of claim 2 wherein:
   a deflector means for creating a swirling action in said sewage is mounted coaxially with said pipe.

4. The incinerator of claim 3 wherein:
   said deflector means comprises a diverter cone mounted adjacent the lower end of said vertical pipe member.

5. The incinerator of claim 2 further including:
   plate deflector means surrounding said vertical pipe member and secured vertically above said concentric tube member for deflecting sewage raised by said gas toward the sides and bottom of said tank means.

6. A waste incinerator for converting sewage or other wastes into non-toxic gaseous form comprising:
   combustion means for producing pressurized, high temperature gas;
   tank means for containing the sewage to be treated;
   injector means for introducing said gas into said sewage below the initial level thereof;
   exhaust means for conveying said gas and vaporized sewage to the exterior of said tank means;
   residence means for raising the temperature of said gas and said vaporized sewage to oxidize and deodorize said organic contaminates;
   said residence means is heated by gas from a tap on said injector means.

7. A waste incinerator according to claim 6 further including:
   tank cooling means for cooling the exterior of said tank means;
   said cooling means comprising an annulus between the inner portion of said tank means and the exterior of said tank means;
   whereby the combustion air for said combustion means travels through said annulus to cool said tank.

8. The incinerator of claim 6 wherein:
   said residence means comprises a labyrinth chamber means for causing said gas to undergo at least two reversals in direction before being exhausted to the atmosphere.

* * * * *